(12) United States Patent
Allampalayam Jayaraman et al.

(10) Patent No.: US 10,844,197 B2
(45) Date of Patent: *Nov. 24, 2020

(54) BLOWABLE INSULATION MATERIAL WITH ENHANCED DURABILITY AND WATER REPELLENCY

(71) Applicant: PRIMALOFT, INC., Latham, NY (US)

(72) Inventors: Kannan Allampalayam Jayaraman, Albany, NY (US); Joseph Rumiesz, Jr., Voorheesville, NY (US); Vanessa Mason, Rexford, NY (US)

(73) Assignee: PRIMALOFT, INC., Latham, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/297,067

(22) Filed: Mar. 8, 2019

(65) Prior Publication Data
US 2019/0218369 A1    Jul. 18, 2019

Related U.S. Application Data

(63) Continuation of application No. 14/152,261, filed on Jan. 10, 2014, now Pat. No. 10,266,674.
(Continued)

(51) Int. Cl.
*C08K 7/02*        (2006.01)
*C08K 9/06*        (2006.01)
(Continued)

(52) U.S. Cl.
CPC ............... *C08K 7/02* (2013.01); *B68G 1/00* (2013.01); *C08K 9/06* (2013.01); *D04H 1/04* (2013.01);
(Continued)

(58) Field of Classification Search
None
See application file for complete search history.

(56) References Cited

U.S. PATENT DOCUMENTS 3,050,821 A    8/1962  Kilian
3,118,012 A    1/1964  Kilian
(Continued)

FOREIGN PATENT DOCUMENTS

EP    0217484 A2    4/1987
EP    0279677 A2    8/1988
(Continued)

OTHER PUBLICATIONS

International Search Report and Written Opinion for PCT/US2014/011004 dated Feb. 28, 2014.
(Continued)

*Primary Examiner* — Chinessa T. Golden
(74) *Attorney, Agent, or Firm* — Heslin Rothenberg Farley & Mesiti P.C.

(57) ABSTRACT

A blowable insulation material comprising natural fibers and short cut synthetic fibers or fiber balls. The natural fibers and short cut synthetic fibers or fiber balls are individually treated with a water repellent to impart water repellency to the fibers, and later aerodynamically blended together. The water repellent fibers constitute a part or most of the blowable insulation material, thus enhancing the durability of the structure as well as water repellency, which may be advantageous during washing or laundering.

20 Claims, 1 Drawing Sheet

Short-cut fibers trapped inside a down cluster

Related U.S. Application Data

(60) Provisional application No. 61/755,195, filed on Jan. 22, 2013, provisional application No. 61/791,914, filed on Mar. 15, 2013.

(51) Int. Cl.

| | | |
|---|---|---|
| *D06M 10/02* | (2006.01) | |
| *D06M 13/188* | (2006.01) | |
| *D06M 16/00* | (2006.01) | |
| *B68G 1/00* | (2006.01) | |
| *D04H 1/04* | (2012.01) | |
| *D04H 1/06* | (2012.01) | |
| *D04H 1/4266* | (2012.01) | |
| *D04H 1/54* | (2012.01) | |
| *D04H 1/732* | (2012.01) | |

(52) U.S. Cl.
CPC .............. *D04H 1/06* (2013.01); *D04H 1/4266* (2013.01); *D04H 1/54* (2013.01); *D04H 1/732* (2013.01); *D06M 10/025* (2013.01); *D06M 13/188* (2013.01); *D06M 16/00* (2013.01); *D06M 2200/12* (2013.01); *D06M 2200/40* (2013.01)

(56) References Cited

U.S. PATENT DOCUMENTS

| | | |
|---|---|---|
| 3,454,422 A | 7/1969 | Mead et al. |
| 4,167,604 A | 9/1979 | Aldrich |
| 4,481,247 A | 11/1984 | Tesch et al. |
| 4,537,594 A | 8/1985 | Fleet et al. |
| 4,588,635 A | 5/1986 | Donovan |
| 4,618,531 A | 10/1986 | Marcus |
| 4,661,405 A | 4/1987 | Greene et al. |
| 4,666,763 A | 5/1987 | King et al. |
| 4,681,789 A | 7/1987 | Donovan et al. |
| 4,693,917 A | 9/1987 | Geloen |
| 4,820,574 A | 4/1989 | Tesch |
| 4,869,922 A | 9/1989 | D'Agostino et al. |
| 4,911,980 A | 3/1990 | Tesch |
| 4,992,327 A | 2/1991 | Donovan et al. |
| 5,164,253 A | 11/1992 | Greak |
| 5,218,740 A | 6/1993 | Synder et al. |
| 5,262,208 A | 11/1993 | Krapivina et al. |
| 5,286,556 A | 2/1994 | Tesch |
| 5,895,558 A | 4/1999 | Spence |
| 6,046,119 A | 4/2000 | Kaibe et al. |
| 6,232,249 B1 | 5/2001 | Kawada |
| 6,329,051 B1 | 12/2001 | Groh et al. |
| 6,329,052 B1 | 12/2001 | Groh et al. |
| 6,416,633 B1 | 7/2002 | Spence |
| 6,492,020 B1 | 12/2002 | Ahn et al. |
| 6,517,933 B1 | 2/2003 | Soane et al. |
| 6,589,652 B2 | 7/2003 | Groh et al. |
| 7,074,242 B2 | 7/2006 | Palmer et al. |
| 7,501,632 B2 | 3/2009 | Ohashi et al. |
| 7,682,693 B2 | 3/2010 | Molina et al. |
| 7,790,639 B2 | 9/2010 | Davenport et al. |
| 8,298,627 B2 | 10/2012 | Minami et al. |
| 8,309,033 B2 | 11/2012 | Finn et al. |
| 2010/0071112 A1 | 3/2010 | Iwashita et al. |
| 2012/0263910 A1 | 10/2012 | Baychar |
| 2012/0276332 A1 | 11/2012 | Conolly et al. |
| 2012/0288662 A1 | 11/2012 | Conolly |
| 2014/0141179 A1 | 5/2014 | Pavlos et al. |
| 2014/0206796 A1 | 7/2014 | Allampalayam Jayaraman et al. |

FOREIGN PATENT DOCUMENTS

| | | |
|---|---|---|
| EP | 0436327 B1 | 2/1995 |
| EP | 1717192 A1 | 11/2006 |
| GB | 1275692 | 5/1972 |
| GB | 1300537 | 12/1972 |
| JP | S53-7309 U1 | 1/1978 |
| JP | S5725455 A | 2/1982 |
| JP | S5930968 A | 2/1984 |
| JP | S63-68192 A | 3/1988 |
| JP | H03193972 A | 8/1991 |
| JP | H0450381 A | 2/1992 |
| JP | H10-219526 A | 8/1998 |
| JP | 3355392 | 12/2002 |
| JP | 2003-502516 A | 1/2003 |
| JP | 3383855 | 3/2003 |
| JP | 2007-211387 A | 8/2007 |
| WO | 9814646 | 4/1998 |
| WO | 2007078450 A2 | 7/2007 |
| WO | 2011/143488 A2 | 11/2011 |
| WO | 2012150902 A1 | 11/2012 |

OTHER PUBLICATIONS

International Preliminary Report on Patentability for PCT/US2014/011004 dated Feb. 9, 2015.

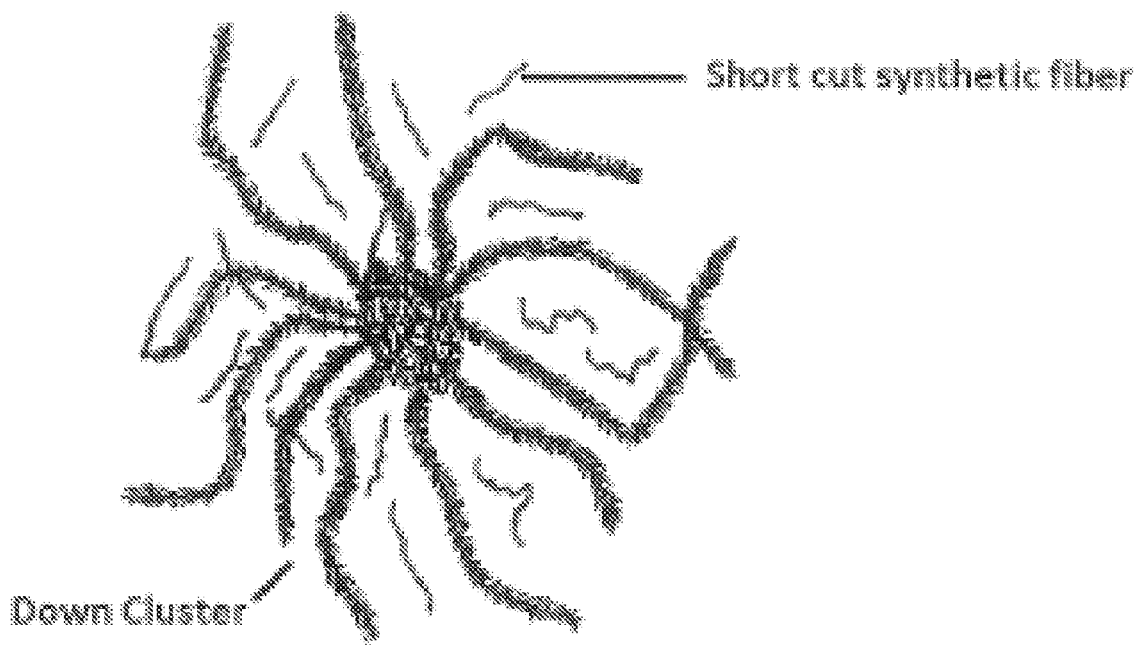
Short-cut fibers trapped inside a down cluster

BLOWABLE INSULATION MATERIAL WITH ENHANCED DURABILITY AND WATER REPELLENCY

CROSS REFERENCE TO RELATED APPLICATIONS

This application is a continuation of U.S. patent application Ser. No. 14/152,261, filed Jan. 10, 2014, which claims priority benefits to U.S. Provisional Patent Application Ser. No. 61/755,195 filed Jan. 22, 2013 and U.S. Provisional Patent Application Ser. No. 61/791,914 filed Mar. 15, 2013. The entire contents of said prior applications are hereby incorporated herein by reference.

FIELD OF THE INVENTION

The invention relates to down-like insulating material and a method for manufacturing the same.

BACKGROUND OF THE INVENTION

There have been many attempts to achieve an insulating material having down-like qualities for use in insulating articles such as clothing, sleeping bags, comforters, and the like. Prior efforts to develop a feasible material have most often yielded those that are too heavy and dense to be considered down-like.

An exception to this is for example, U.S. Pat. No. 4,588,635 to Donovan which discloses a superior synthetic down and has particular reference to light-weight thermal insulation systems which can be achieved by the use of fine fibers in low density assemblies and describes a range of fiber mixtures, that, when used to fabricate an insulating batt, provides advantageous, down-like qualities such as a high warmth-to-weight ratio, a soft hand, and good compression recovery. This material approaches, and in some cases might even exceed the thermal insulating properties of natural down. From a mechanical standpoint, however extremely fine fibers suffer from deficiencies of rigidity and strength that make them difficult to produce, manipulate and use. Recovery properties of such a synthetic insulator material are enhanced by larger fiber diameters, but an increase in the large fiber component will seriously reduce the thermal insulating properties overall. The problems associated with mechanical stability of fine fiber assemblies are exacerbated in the wet condition since surface tension forces associated with the presence of capillary water are considerably greater than those due to gravitational forces or other normal use loading and they have a much more deleterious effect on the structure. However, unlike waterfowl down, the disclosed fiber combination described provides excellent resistance to wetting.

Another exception is U.S. Pat. No. 4,992,327 to Donovan et al. which discloses the use of binder fiber components to improve insulator integrity without compromising desired attributes. More specifically the invention disclosed therein relates to synthetic fiber thermal insulator material in the form of a cohesive fiber structure, which structure comprises an assemblage of: (a) from 70 to 95 weight percent of synthetic polymeric microfibers having a diameter of from 3 to 12 microns; and (b) from 5 to 30 weight percent of synthetic polymeric macrofibers having a diameter of 12 to 50 microns, characterized in that at least some of the fibers are bonded at their contact points, the bonding being such that the density of the resultant structure is within the range 3 to 16 kg/m.sup.3, the thermal insulating properties of the bonded assemblage being equal to or not substantially less than the thermal insulating properties of a comparable unbonded assemblage. The reference also describes a down-like cluster form of the preferred fiber blends. The distinct performance advantages of the cluster form over the batt form are also disclosed in the patent.

However, these prior art clusters often were generally hand fabricated in a slow, tedious, batch process. Furthermore, the prior art materials were not easily blowable materials which could be used with conventional manufacturing equipment. Therefore there was a need for a blowable material which may be used as a partial or full replacement for down which may be manufactured and blown using conventional equipment.

In part as a result of this need, there was developed blowable insulation clusters as described in U.S. Pat. No. 6,329,051. The '051 patent described blowable clusters made from shredded bonded batt or bonded web. The web or batt was described as the same fiber blend described in the '327 patent to Donovan. By shredding the batt or web formed of the materials described in the '327 patent the clusters were found to achieve down-like qualities including loft and insulating properties. Such clusters, in an admixture with natural material, is described in U.S. Pat. No. 6,329,052. Note, the disclosure of the aforementioned patents are incorporated fully herein by reference.

Another example is disclosed in U.S. Pat. No. 7,790,639, which relates to blowable insulative materials made from natural fibers and mixtures.

While the above mentioned blowable insulation materials are easily blowable with conventional blowers and can be used as a partial or full replacement for down or down-like insulative materials, they, however, have problems associated with weight and laundrability when not used properly. These materials could get wet during laundering and can permanently lose their insulative properties due to clumping. The blowable insulation clusters of the '051 and '052 patents incorporate only synthetic fibers. In contrast, the present invention is directed to provide blowable insulation material being made of natural fibers and short cut synthetic fibers.

SUMMARY OF THE INVENTION

It is an object of the invention to provide a blowable insulation material for use as a partial or a complete replacement for down.

One embodiment of the present invention is a blowable insulation material comprising a mix of natural fibers and short cut synthetic fibers and/or fiber balls. The insulation material may be used in winter clothing, sleeping bags, comforters, pillows and the like. The natural fibers can be treated with a water repellent to impart water repellency to the fibers. The water repellent fibers can constitute a part or most of the blowable insulation material, thus enhancing the durability of the structure as well as water repellency, which may be advantageous during washing or laundering. The chemical used for imparting water repellency can be any type of water repellent, including but not limited to fluorocarbons, silicones, and wax emulsions. According to one embodiment, a solution of zirconium acetate is preferred due to its environmental safety. The chemical treatment used for imparting water repellency, however, can be any of those described in U.S. Pat. No. 4,537,594, for example. The natural fibers themselves can be any of wool, cotton, flax, animal hair, silk, and down, although natural down is the most preferred material. Alternatively, the water repellent properties for down/natural fibers can be imparted using different techniques which are not just limited to wet bath or dry spraying processes. Various surface energy modification techniques, which are well known in the art such as plasma treatment, can also be employed to treat the down clusters for providing water repellent properties. The short cut synthetic fibers can have a denier between 0.5 and 15 and can have a cut length between 5 mm and 25 mm. The short cut synthetic fibers can be coated with a slickening agent or lubricant to provide water repellent properties. The synthetic fibers used can include those described in U.S. Pat. Nos. 7,682,693 and 7,074,242 for example. In a preferred embodiment, the natural fibers are down clusters, and the short cut synthetic fibers are trapped in barbs of the down clusters. Fiber balls described in U.S. Pat. Nos. 4,618,531 and 5,218,740 can also be used in place of short fibers if desired.

Although down clusters are referred to herein, "down clusters" include down, natural down, down feathers, down clusters, and a combination thereof.

Another embodiment of the present invention is a method for manufacturing a blowable insulation material comprising the steps of mixing natural fibers with short cut synthetic fibers. The insulation material may be used in winter clothing, sleeping bags, comforters and the like. The natural fibers can be treated with a water repellent to impart water repellency to the fibers. The water repellent fibers can constitute a part or most of the blowable insulation material, thus enhancing the durability of the structure as well as water repellency, which may be advantageous during washing or laundering. The chemical used for imparting water repellency can be any type of water repellent, including but not limited to fluorocarbons, silicones, and wax emulsions. According to one embodiment, a solution of zirconium acetate is preferred due to its environmental safety. The chemical treatment used for imparting water repellency, however, can be any of those described in U.S. Pat. No. 4,537,594, for example. Alternatively, the water repellent properties for down/natural fibers can be imparted using different techniques which are not just limited to wet bath or dry spraying processes. Various surface energy modification techniques, which are well known in the art such as plasma treatment, can also be employed to treat the down clusters for providing water repellent properties. The natural fibers themselves can be any of wool, cotton, flax, animal hair, silk, and down, although natural down is the most preferred material. The short cut synthetic fibers can have a denier between 0.5 and 15 and can have a cut length between 5 mm and 25 mm. The short cut synthetic fibers can be coated with a slickening agent or lubricant to provide water repellent properties. The synthetic fibers or fiber balls used can include those described in U.S. Pat. Nos. 7,682,693, 7,074,242, 4,618,531, and 5,218,740, for example. In a preferred embodiment, the natural fibers are down clusters, and the short cut synthetic fibers are entangled in barbs of the down clusters.

Although down clusters are referred to herein, "down clusters" include down, natural down, down feathers, down clusters, and a combination thereof.

The various features of novelty which characterize the invention are pointed out in particularity in the claims annexed to and forming a part of this disclosure. For a better understanding of the invention, its operating advantages and specific objects attained by its uses, reference is made to the accompanying descriptive matter in which preferred embodiments of the invention are illustrated.

Thus by the present invention, its objects and advantages will be realized, the description of which should be taken in conjunction with the following detailed description.

BRIEF DESCRIPTION OF THE DRAWING

FIG. 1 illustrates blowable insulation material having short-cut fibers trapped inside a down cluster according to the present disclosure.

DETAILED DESCRIPTION

In one embodiment of the present invention, the blowable insulation material comprises a homogeneous mixture of natural fibers and short cut synthetic fibers or fiber balls, wherein the mixture is blowable and has desired down-like qualities.

Natural fibers or material considered to be within the scope of the present invention include but are not limited to wool, cotton, flax, animal hair, silk, down as well as other natural fibers or materials. However, in a preferred embodiment, the natural fibers are down clusters. Although down clusters are referred to herein, "down clusters" include down, natural down, down feathers, down clusters, and a combination thereof. The natural fibers or material can be treated to provide water repellent properties. Several water repellent chemicals can be used in this process, however, a particular polymer solution of zirconium acetate, which can impart durable water repellant properties with no negative effect on fill power on the natural fiber or material, and no negative impact on the environment is the preferred chemical.

According to one embodiment, clusters (including down) are provided with a water-repellant, bacterial-resistant, low friction cured zirconium acetate finish, such that the down clusters have improved driability following washing and enhanced handle and resistance to clumping. More specifically, the down clusters have thereon a water-repellent, bacterial-resistant, low friction cured zirconium acetate finish. Different treatment processes can be used to treat down clusters with solution of zirconium acetate to impart water repellent properties and one such treatment is disclosed in U.S. Pat. No. 4,537,594, for example, the entire contents of which is incorporated herein by reference. The process involves applying to the down feathers an aqueous emulsion of a curable zirconium acetate, and curing said polymer. The emulsion can be applied by exhaustion, for example. The feathers are thoroughly cleansed prior to application of said copolymer, which can be accomplished by means of a water wash, followed by partial water removal so as to leave a residual moisture content of 5 to 45% based on the weight of completely dry feathers. The copolymer can be cured at 130 degrees to 170 degrees C.

Alternatively, the water repellent properties for down/natural fibers can be imparted using different techniques which are not just limited to wet bath or dry spraying processes. Various surface energy modification techniques, which are well known in the art such as plasma treatment, can also be employed to treat the down clusters for providing water repellent properties. Such treatments or processes are explained in U.S. Pat. Nos. 4,869,922, 5,262,208, 5,895,558, 6,416,633, 7,510,632, 8,309,033, and 8,298,627, the entire contents of which is incorporated herein by reference.

The preferred short cut synthetic/man-made fibers can have a fiber denier or linear density between 0.5 denier to 15 denier. However, fibers in excess of 15 denier can also be used in combination with the blowable insulation material of the present invention. The short cut fibers can have a length ranging from 5 mm to 25 mm, and can be aerodynamically blended with the natural fibers to get homogeneous blend as described above. The preferred fiber balls made of synthetic/man-made fibers can have a fiber denier or linear density between 0.5 denier to 15 denier, for example. Other preferred embodiments utilize fiber-blends comprising water repellant finished or lubricant finished fiber and/or dry fiber and/or binder fiber. For example, the short cut synthetic/man-made fibers of the present invention can be coated with any slickening agent or lubricant for providing water repellent properties. The synthetic fibers/man-made fibers used in this invention include but are not limited to solid, hollow-type, as well as other cross-sectional shapes with or without crimp. Fibers with binding agent on the outer shell may also be used for the instant synthetic/man-made fibers.

The material used to produce the short cut synthetic/man-made fibers used in the present invention are described in U.S. Pat. No. 7,682,693, the entire contents of which is incorporated herein by reference. According to one embodiment, the short cut synthetic/man-made fibers comprise polyester fibers having an average dimension of 0.5 to 15 denier and being coated with a slickener and crimped, the fibers being cut to a length of 5-25 mm and opened. The polyester fibers could be obtained, for instance, by extruding polyester fibers as known in the art. An important aspect of the invention is that the polyester fibers need to have a certain average dimension, i.e., a certain cross-sectional size. The extruded polyester fiber need to be slickened. This is obtained by coating the fibers with a slickener, preferably a silicone slickener, e.g. as described in U.S. Pat. No. 3,454,422. The slickener makes the fibers easier to open and thus provides for separating the fibers from each other. The fibers of the present invention may alternatively be slickened with other slickening agents which may be advantageous in some applications, such as segmented copolymers of polyalkyleneoxide and other polymers, such as polyester, or polyethylene or polyalkylene polymers as is mentioned in U.S. Pat. No. 6,492,020 B1, with the weight percent of the slickener being from about 0.1 to about 1.2% per weight of the fibers.

To obtain the desired properties of the inventive blowable insulation material it is necessary to provide the polyester fibers with a crimp. One example of a suitable crimp is the so called zig-zag crimp, also called mechanical crimp. This type of crimp, which is per se known, is obtained by passing a tow of extruded fibers through a narrow gap between two crimp rollers. Further examples of mechanical crimp methods are referred to in EP 929700 A1 and U.S. Pat. No. 6,492,020 B1. Another crimp type is the spiral crimp. A spiral crimp is, contrary to the two-dimensional zig-zag crimp, three-dimensional. A spiral crimp could be obtained by, for example, the methods described in U.S. Pat. Nos. 3,050,821, 3,118,012, EP 929700 A1 and U.S. Pat. No. 6,492,020 B1. Preferably the crimp frequency is adjusted so that each cut fiber, at the given cut length, is provided with at least one or two crimps. Further it will be appreciated that both solid and hollow fibers could be used as well as fibers of different cross-sections.

According to one embodiment, the short cut synthetic/man-made fibers can be fully opened and blended with natural fibers or materials. Such opening and blending process is described in U.S. Pat. No. 7,074,242, for example, the entire contents of which is incorporated herein by reference. The method can include the steps of obtaining natural down feathers; washing the down in accordance with a predetermined washing process to produce prepared down; blending the prepared down with the short cut synthetic/man-made fibers in accordance with a predetermined blending process to produce the filling material. The blending step is carried out by blending the prepared down at least 50% by weight short cut synthetic/man-made fibers or fiber balls. The washing step is carried out by the sub-steps of: (a) washing the down with hot soapy water, (b) rinsing the down with hot water; (c) rinsing the down with cold water; (d) treating the down clusters for water repellency; (e) drying the rinsed down; and (f) dedusting and cooling the dried down. The drying sub-step is carried out by drying 40 pounds of washed down for substantially 20 minutes at a temperature of substantially 105 degrees C. The dedusting and cooling sub-step can further include injecting ozone into the down, and can be carried out utilizing a screened centrifuge.

The method for manufacturing the inventive blowable insulation material, according to one embodiment of the present invention, comprises the steps of:

(1) Treating the natural fibers or materials to provide water repellent properties. During this process, the natural fibers or materials may be opened, cleaned, washed, and dried, if necessary. The treatment for water repellency can be done in dry or wet conditions, although a wet process is the preferred method.

(2) Opening of short cut synthetic/man-made fibers and blending with natural fibers or materials. The blending step can be carried out using dry or wet process, although a dry process is the preferred method, in which down clusters are fed to a storage/mixing chamber using controlled air stream before which it hits an another air stream from opposite direction carrying fully opened short cut fibers and thereby both down clusters and short cut fibers are homogenously blended. This process of aerodynamic blending is preferred method of blending to achieve very less breakage of down clusters and thereby achieving highest possible fill power. For better results it is preferred to go for a batch quantity of at least 100 kg.

(3) Fiber balls can also be chosen in place of short cut fibers if the application is appropriate.

Consequently, in the blowable insulation material of the present invention, the short fibers or fiber balls are aerodynamically trapped in the barbs and the tiny barbs with knots of the down clusters, that is, the short fibers formed of synthetic fibers are uniformly incorporated therein inseparably, making it possible to impart the properties of the short fibers to the down.

The resultant novel, inventive blowable insulation material, is shown in FIG. 1, for example, which has the following characteristics:

(1) It has superior durability in that it can withstand many more washing and laundering cycles than those available in the market today. The inventive material exhibits excellent water repellent properties without any clumping or knotting during repeated washing and laundering.

(2) It has excellent thermal insulative properties even when exposed to wet conditions.

(3) The fill power of the natural down fiber is maintained after it is treated with chemicals for water repellency.

(4) It provides a significant cost advantage when compared to 100% down insulation. However, it has been found that at least 50% by weight of natural down fiber must be employed in order to achieve the favorable characteristics of the present invention.

(5) Superior compressibility properties on final blended product due to aerodynamic blending.

A variety of other variable factors may be modified to obtain desired effects on the blowable insulation material. Those of skill in the art will appreciate that these other factors can be optimized for their desired purpose without exceeding the scope of the instant invention.

Some exemplary test methods that were used to evaluate physical properties of the inventive blowable insulation material are as follows:

EN 13543:2002—Manufactured articles filled with feather and down, which was used to measure water absorption of the filling material;

AATCC method for studying washability and laundrability of clothing;

IDFB 10B method for measuring fill power;

IDFB Method—Measuring drying time of blowable insulation; and

ISO 11092—Measurement of Thermal and Water vapor resistance under steady state conditions.

The test results obtained using these tests are as follows:
(1) Water Absorption Test: EN13543—10× less water weight than normal down clusters.
(2) Drying Time: IDFB Method—5× faster drying time than normal down clusters.
(3) Dry and Wet Thermals: ISO—90% of Dry thermals are maintained in wet condition.
(4) Fill Power Measurement: IDFB 10B—Same fill power for treated down as down before chemical treatment.
(5) Fill Power Measurement: IDFB 10B—80% to 90% of fill power of unblended down is achieved after adding 30% to 40% of short cut synthetic fibers.
(6) Washability Analysis: AATCC 135—Performance passed, no clumping or knotting observed.

The invention further contemplates utilizing man-made fiber blends or a mixture of natural and man-made fiber blends that are not discussed above. These blend ranges limit average fiber diameter to ensure a high level of insulating performance. In some instances, an average fiber diameter greater than that defined by the cited patents may be desirable. For example, relatively large diameter fibers may be utilized if the end product is a pillow or upholstery and compressional stiffness is an important requirement.

Also depending upon application, it may be desirable to blend the so formed blowable insulation material in an admixture with other fibers such as other natural and/or man-made fibers or material depending upon the desired result being sought.

Thus by the present invention its advantages will be realized and although preferred embodiments have been disclosed and described in detail herein, its scope should not be limited thereby rather its scope should be determined by that of the appended claims.

What is claimed is:

1. A blowable insulation material comprising:
   at least 50% by weight of natural down clusters; and
   short cut synthetic fibers having a length ranging from 5 mm to 25 mm, and a fiber denier between 0.5 denier and 15 denier, wherein said short cut fibers are crimped and are coated with a slickening agent or lubricant;
   wherein said short cut synthetic fibers are aerodynamically trapped in barbs of the natural down clusters, the short cut synthetic fibers being uniformly incorporated in barbs of the natural down clusters inseparably, making it possible to impart the properties of the short cut synthetic fibers to down;
   wherein said blowable insulation material is blowable using conventional equipment and wherein said blowable insulation material does not comprise binder fiber.

2. The blowable insulation material of claim 1, wherein the natural down clusters are treated with a water repellent to impart water repellency.

3. The blowable insulation material of claim 2, wherein water repellency of the natural down clusters is imparted using a water-repellent, bacterial-resistant, low friction cured solution of zirconium acetate.

4. The blowable insulation material of claim 1, wherein the natural down clusters are natural down clusters treated with zirconium acetate.

5. The blowable insulation material of claim 1, wherein the short cut synthetic fibers are coated with a silicone slickener.

6. The blowable insulation material of claim 1, wherein the synthetic fibers are selected from the group consisting of polyamide, polyester, acrylic, acetate, nylon, polyolefin and a combination thereof.

7. The blowable insulation material according to claim 1, wherein the synthetic fibers are polyester fibers.

8. The blowable insulation material of claim 1, comprising at least 40% by weight of the short cut synthetic fibers and wherein said short cut synthetic fibers have a two-dimensional crimp.

9. The blowable insulation material of claim 1, wherein the blowable insulation material passes washability test method AATCC 135 with no clumping or knotting observed.

10. An article comprising the blowable insulation material according to claim 1.

11. The article according to claim 10, wherein the article is selected from clothing, a sleeping bag, a pillow, and a comforter.

12. A method for manufacturing the blowable insulation material according to claim 1, said method comprising aerodynamically mixing:
   at least 50% by weight of natural down clusters; and
   short cut synthetic fibers having a length ranging from 5 mm to 25 mm, and a fiber denier between 0.5 denier and 15 denier, wherein said short cut fibers are crimped and are coated with a slickening agent or lubricant;
   such that said short cut synthetic fibers become aerodynamically trapped in barbs of the natural down clusters, the short cut synthetic fibers being uniformly incorporated in barbs of the natural down clusters inseparably, making it possible to impart the properties of the short cut synthetic fibers to down, thereby forming a blowable insulation material that is blowable using conventional equipment.

13. The method of claim 12, wherein the natural fibers are treated with a water repellent to impart water repellency.

14. The method of claim 13, wherein the chemical used for imparting water repellency is a water-repellent, bacterial-resistant, low friction cured solution of zirconium acetate.

15. The method of claim 12, wherein the natural down clusters are natural down clusters treated with zirconium acetate.

16. The method of claim 12, wherein the short cut synthetic fibers are coated with a silicone slickener.

17. The method of claim 12, wherein the synthetic fibers are selected from the group consisting of polyamide, polyester, acrylic, acetate, nylon, polyolefin and a combination thereof.

18. The method of claim 12, wherein the synthetic fibers are polyester fibers.

19. The method of claim 12, further comprising the step of incorporating the insulation material in apparel, sleeping bags, bedding products, or other insulating products.

20. The method of claim 12, wherein the blowable insulation material passes washability test method AATCC 135 with no clumping or knotting observed.

\* \* \* \* \*